July 14, 1959 W. L. GILL 2,894,523
AUTOMATIC VENT CAP FOR AIRCRAFT STORAGE BATTERIES
Filed Jan. 9, 1956

INVENTOR.
WALTER L. GILL
BY
ATTORNEYS,

United States Patent Office 2,894,523
Patented July 14, 1959

2,894,523

AUTOMATIC VENT CAP FOR AIRCRAFT STORAGE BATTERIES

Walter L. Gill, Redlands, Calif., assignor to Gill Electric Manufacturing Corporation, a corporation of California Application January 9, 1956, Serial No. 557,922

3 Claims. (Cl. 137—43)

This invention relates to vent caps for electric storage batteries of the type used upon airplanes.

It is common practice to provide airplane storage batteries with vent caps constructed to permit the escape of gases from the batteries as long as said batteries are in a substantially upright position but which caps automatically close to prevent the escape of the liquid electrolyte whenever the battery is inverted or tipped beyond a predetermined angle, in the operation of the airplane.

Many of the earlier forms of automatically closing vent caps employed a single valve which was open until the battery was tipped and was then automatically closed. Some of these single valved devices were found to be unsatisfactory because in some cases internal gas pressures forming in the battery during tipping or inversion became so great that the force tending to open the valve when tipping ceased (usually that exerted by a tipping weight by which the valve was operated) was not great enough to open the valve against such internal pressure.

To overcome this difficulty later devices of this nature employed two valves, one a high pressure valve of small area controlling a relatively small escape port and the other a low pressure valve of much larger area controlling a correspondingly larger escape conduit for the gases, both of said valves being moved to their seats under the action of a tilting weight; the high pressure valve of small area being first moved by the action of the weight to open position to release any excessive pressure existent in the battery and the low pressure valve being thereafter moved to uncover the larger escape port which functions to permit the free escape of gases during the normal upright position of the battery.

A two valved device of the general character of that above described, is illustrated in U.S. Patent #2,717,610, issued to me on September 13, 1955.

This application is a continuation in part of application Serial No. 544,934, filed on November 4, 1955.

The primary object of the device of the present application is to insure such a firm seating of the valves and especially the large area, low pressure valve, as to prevent leakage of the electrolyte even under severe pressure differentials between internal and external pressures. This is rendered necessary because the pressure differentials are frequently very considerable, such differentials arising not only from the length of time during which the escape valves are closed and internal pressures have time in which to build up but also from the fact that modern jet planes travel from high altitudes to low altitudes in a very short time.

The invention will be best understood by reference to the accompanying drawing wherein.

Figure 1:
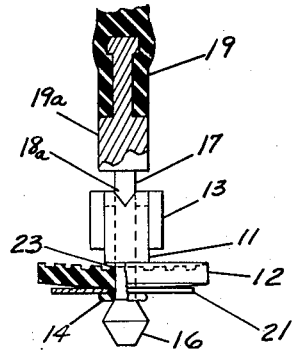
Figure 1 is a view partly in side elevation and partly in section of the valve assembly hereinafter described.
Figure 2:
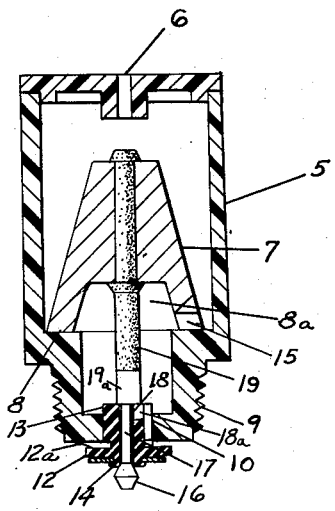
Figure 2 is a central vertical section showing the device in upright position.
Figure 3:
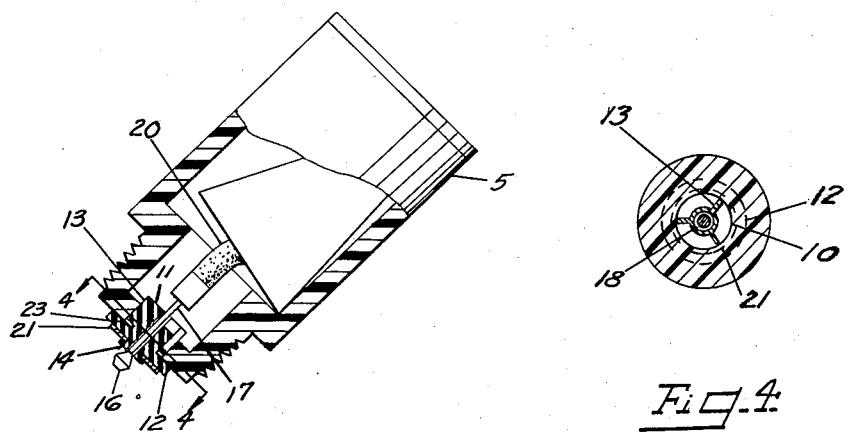
Figure 3 is a view like Figure 2 but showing the device in tipped position.
Figure 4:
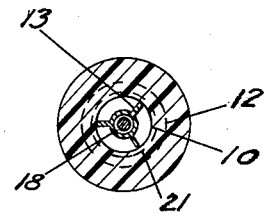
Figure 4 is a horizontal sectional view upon line 4—4 of Figure 2.

In the drawing 5 designates a casing of hard rubber or any other suitable dielectric and acid proof material, the top of which has a vent opening 6 formed therethrough. A weight 7 formed preferably of lead and preferably, though not necessarily, in the form of a truncated cone, is seated, when the battery is in an upright position, upon a circumferential seat 8. The weight may be provided with an underside cavity $8^a$, whereby to raise its center of gravity and increase its sensitivity to tipping influences. The lower part of casing 5 is threaded or otherwise formed at 9 for engagement in the usual filler opening of a battery. A main gas escape opening 10 is formed axially through the bottom of casing 5. This is the opening of considerable diameter through which gas escapes freely in the normal operation of the battery. The low pressure valve assembly comprises a vertical tubular stem 11, an integral horizontal disc like valve 12, radial guide ribs 13 and a downwardly extending protuberant head 14. All of these elements, 11 to 14 are integral and are made of rubber. The term rubber is generically used and includes artificial or natural rubber substances of a pliable and elastic nature. The guide ribs 13 serve to guide the low pressure valve assembly for vertical movement in opening 10, the spaces between said guide ribs providing channels through which gas escapes freely upward during normal operation of the device, said gas passing through a passage 15 in weight 7 and out of vent opening 6.

The high pressure valve 16 is integral with and is formed upon the lower end of a slender metallic rod 17 of stainless steel, or like acid proof metal. The upper face of valve 16 makes its seating upon the lower face of protuberant head 14 where said valve closes the lower end of a bore or channel 18 formed axially through stem 11, said channel being enough larger than rod 17 to permit the initial escape of gas of abnormally high pressure whenever valve 16 is moved from its seat. Gas passing upwardly through channel 18 escapes through lateral ports $18^a$ of stem 11 when the battery is tipped beyond a predetermined degree and the weight 7 is rocked from its seat.

Rod 17 constitutes the lower member of a two part valve stem, the upper part of which is constituted by a relatively thick rubber member 19 that is affixed axially in the weight and the lower part of which receives, embraces and grips the upper portion of rod 17. The upper end of rigid metallic rod 17 terminates far enough below the point at which the rubber member of the two part stem leaves the weight, to leave a bendable section 20 of said two part stem, below the weight and above rod 17. Thus the weight may tip from its seat to exert an upward pull upon valve 16 while leaving the low pressure valve properly aligned in opening 10. The low pressure valve 12 makes closing contact upon an accurately machine flat valve seat $12^a$ formed upon the bottom of the casing and to aid in causing the low pressure valve to seek a firm seating upon said face the valve may be made slightly concavo-convex with its concave face disposed upwardly. The lower end of member 19 carries a ferrule $19^a$ which thrusts the low pressure valve from its seat when the weight is seated upon seat 8.

Since it is desirable to make the opening 10 of such amplitude as to permit a very free flow of gas there has been found to be a tendency for the upward pull of the stem 17 upon the low pressure valve, plus the gas pressure upon the low pressure valve, to force the central part of the low pressure valve upwardly past the point where it lies completely flat against its seat in closing. To prevent this a rigid disc or washer 21 of stainless steel, fibre or other suitable acid proof material is disposed beneath valve 12 and is held in place by protuberant rubber head 14. Thus when the valve 12 reaches a position where it lies completely flat against its seat this rigid element (disc 21) comes into action and prevents stem 11 from moving further upward. This prevents upward movement of the central portion of valve disc 12 from rocking the outer edges thereof from their seating with consequent leakage of the electrolyte. To increase the flexibility of valve 12 with respect to its integral stem 11 said stem may be circumferentially undercut at its juncture with valve disc 12, as indicated at 23.

The coactive arrangement described, between a compressible rubber valve disc 12 and a rigid backing up member 21 has been found to be highly efficient in securing a tight seating of the relatively large area, low pressure valve. The arrangement of the parts is such that when the weight tips to a predetermined degree the two part valve stem draws the high pressure valve against its seat upon the low pressure valve and draws the low pressure valve to its seat upon the bottom of casing 5. When the casing returns to upright position, initial downward movement of the two part stem moves the high pressure valve off of its seat upon the low pressure valve. This gives an initial vent for the escape of high pressure gases.

Further movement of the weight to seating position causes the lower end of the rubber portion of the two part valve stem to thrust the low pressure valve stem downwardly and out of contact with its seat. Gas can then pass freely upward through gas escape opening or channel 10 of casing 5.

It is to be understood that the invention is not limited to the precise construction shown but that it includes within its purview whatever changes fairly come within either the terms or the spirit of the appended claims.

I claim:

1. In a low pressure valve assembly an integral rubber element comprising a stem having a vertical channel formed axially therethrough having a high pressure valve seat at its lower end, a plurality of radial guide ribs upon the outer face of the stem, a circumferential notch formed around the stem adjacent its lower end to leave a protuberant head upon the lower end of the stem, and a disc like valve carried by the stem having its upper face slightly concave, and a washer-like, rigid member held to the stem by the protuberant head and underlying the disc like valve, said rigid member serving, upon upward movement of the stem, to compress the disc like valve and then limit the upward movement of the low pressure valve stem.

2. A device of the character described comprising a casing having a gas escape opening extending upwardly thereinto from its bottom and having a valve seat upon its bottom around said gas escape opening, a low pressure valve structure comprising a one piece structure of acid proof, flexible rubber-like material consisting of a central upstanding tubular stem materially smaller in diameter than the gas escape opening having integral spaced guide ribs upon its sides which engage the side walls of the opening to center and guide the tubular stem therein, the spacing of said ribs permitting the passage of gas through the spaces between said ribs, a valve disc integral with and of like material as the stem, said valve disc being of such greater diameter than the gas escape opening as to overlap and seat upon the bottom face of the casing entirely around said opening, the tubular stem comprising a portion extending downwardly through the valve disc to a point below the lower face of the valve disc and having a valve seat formed about the mouth of the bore of said tubular stem at the lower end of said bore, a tiltable weight within the casing, a relatively slender high pressure valve stem projecting downwardly through the tubular stem and having a small area high pressure valve upon its lower end which engages said valve seat to tend to move the low pressure valve disc to its seating upon the bottom of said casing, and a rigid backing up disc also of acid resistant material supported by said downwardly extending portion of the tubular stem and bearing against the under face of the low pressure valve disc and of such greater diameter than the gas escape opening that when the high pressure valve draws the low pressure valve to its seating position said backing up disc binds the low pressure valve disc between itself and the under face of the casing to thereby limit the upward movement of the rubber stem in the gas escape opening of the casing.

3. A structure as recited in claim 2 wherein the low pressure valve disc is slightly dished with its concave side disposed toward the under face of the casing.

References Cited in the file of this patent

UNITED STATES PATENTS

| | | |
|---|---|---|
| 788,352 | Crawford | Apr. 25, 1905 |
| 1,184,143 | Slater | May 23, 1916 |
| 2,306,974 | Oestermeyer | Dec. 29, 1932 |
| 2,480,850 | Goldberg | Sept. 6, 1949 |
| 2,717,610 | Gill | Sept. 13, 1955 |
| 2,770,666 | Knight | Nov. 13, 1956 |

FOREIGN PATENTS

| | | |
|---|---|---|
| 287,719 | Great Britain | Mar. 29, 1928 |